US011698098B2

(12) United States Patent
Stinson

(10) Patent No.: US 11,698,098 B2
(45) Date of Patent: Jul. 11, 2023

(54) BUCKET HOOK

(71) Applicant: MADI, LLC, Greenville, SC (US)

(72) Inventor: Ralph Dudley Stinson, Lutz, FL (US)

(73) Assignee: MADI, LLC, Greenville, SC (US)

( * ) Notice: Subject to any disclaimer, the term of this patent is extended or adjusted under 35 U.S.C. 154(b) by 0 days.

(21) Appl. No.: 17/825,008

(22) Filed: May 26, 2022

(65) Prior Publication Data

US 2022/0381287 A1 Dec. 1, 2022

Related U.S. Application Data

(60) Provisional application No. 63/194,419, filed on May 28, 2021.

(51) Int. Cl.
*F16B 45/02* (2006.01)
*B25H 5/00* (2006.01)

(52) U.S. Cl.
CPC .............. *F16B 45/026* (2021.05); *B25H 5/00* (2013.01)

(58) Field of Classification Search
CPC ......... F16B 45/026; F16B 45/024; B25H 5/00
See application file for complete search history.

(56) References Cited

U.S. PATENT DOCUMENTS

| | | | | |
|---|---|---|---|---|
| 982,604 A * | 1/1911 | Herring | ................... | E06C 7/146 248/303 |
| 1,144,415 A * | 6/1915 | Jones | ....................... | B66C 1/36 24/599.7 |
| 2,519,980 A * | 8/1950 | Renz | ....................... | E06C 7/146 24/600.9 |
| 2,598,479 A * | 5/1952 | Wraith | ...................... | E06C 7/14 248/211 |
| 2,681,785 A * | 6/1954 | Jenny | ........................ | E06C 7/14 248/210 |
| 2,683,553 A * | 7/1954 | Ariss | ......................... | E06C 7/14 220/699 |
| 2,991,037 A * | 7/1961 | Becher, Jr. | .............. | E06C 7/146 248/211 |
| 4,011,951 A * | 3/1977 | Boyer | ...................... | A01K 5/01 119/51.5 |
| 6,820,781 B1 * | 11/2004 | Gardner | .................... | B60R 9/00 224/547 |
| 6,837,383 B1 * | 1/2005 | McElhaney, Jr. | ........ | B25H 5/00 211/70.6 |
| D613,151 S * | 4/2010 | Goodman | ...................... | D8/367 |
| 7,789,358 B1 * | 9/2010 | Adams | .................... | E04G 5/003 248/303 |
| 7,992,833 B1 * | 8/2011 | Goodman | .......... | A47G 25/0614 248/339 |
| D746,127 S * | 12/2015 | Cohen | ............................ | D8/367 |

(Continued)

*Primary Examiner* — David M Upchurch
(74) *Attorney, Agent, or Firm* — Trego, Hines & Ladenheim PLLC; Brandon C. Trego

(57) ABSTRACT

A bucket hook for supporting tools from a utility bucket includes: a first leg, including: a first hook; a gate mounted to the first leg and movable between a first position in which it contacts the first hook, and a second position in which it is pivoted away from the first hook; and spring biasing means resiliently urging the gate towards the closed position; and a second leg spaced from the first leg; and a crossbar interconnecting the first leg and the second leg, wherein the first leg, the second leg, and the crossbar cooperatively define an interior space having an inverted L shape.

20 Claims, 5 Drawing Sheets

(56) References Cited

U.S. PATENT DOCUMENTS

| | | | | |
|---|---|---|---|---|
| 9,790,740 | B2 * | 10/2017 | Bardill | E06C 7/14 |
| D810,554 | S * | 2/2018 | Horn | D8/380 |
| D932,288 | S * | 10/2021 | Mefferd | D8/367 |
| 2007/0272813 | A1 * | 11/2007 | Monteleone | E06C 7/146 |
| | | | | 248/303 |
| 2015/0285001 | A1 * | 10/2015 | Bardill | E06C 7/14 |
| | | | | 248/211 |
| 2017/0166000 | A1 * | 6/2017 | Eberly, Jr. | A45F 5/102 |

* cited by examiner

§ BUCKET HOOK

BACKGROUND OF THE INVENTION

This invention relates generally to electrical utility tools, and more particularly to a utility bucket hook for use by utility workers.

Utility workers frequently carry out installation, maintenance, or repair on electrical transmission or distribution equipment mounted to above-ground poles. In order to access the electrical equipment, is typical for a worker to ride in an open-topped "bucket" suspended from the boom of an aerial lift that is mounted to a utility vehicle. Such vehicles are variously referred to as "boom trucks", "bucket trucks", and/or "cherry pickers".

In addition to lifting personnel, there is a need to suspend tools and equipment from utility truck buckets.

BRIEF SUMMARY OF THE INVENTION

This need is addressed by a bucket hook capable of securely supporting tools and equipment from a utility bucket.

According to one aspect of the technology described herein, a bucket hook for supporting tools from a utility bucket includes: a first leg, including: a first hook; a gate mounted to the first leg and movable between a first position in which it contacts the first hook, and a second position in which it is pivoted away from the first hook; and spring biasing means resiliently urging the gate towards the closed position; a second leg spaced from the first leg; and a crossbar interconnecting the first leg and the second leg, wherein the first leg, the second leg, and the crossbar cooperatively define an interior space having an inverted L shape.

According to another aspect of the technology described herein, a bucket hook for supporting tools from a utility bucket includes: a crossbar with a first end and a second end; a first leg extending between a first end that joins the first end of the crossbar and a second end that defines a second hook, the first leg including: a middle segment extending generally parallel to the crossbar and having an inboard end and an outboard end; an upper segment extending between the outboard end of the middle segment and the first end of the first leg; and a lower segment extending between the inboard end of the middle segment and the second end of the first leg; a gate having a proximal end which is pivotally mounted to the first leg by a pivot, and a distal end adjacent a distal end of the first hook, the gate being movable between a first position in which it contacts the first hook, and a second position in which it is pivoted away from the first hook; spring biasing means resiliently urging the gate towards the closed position; and a second leg having a first end that joins the second end of the crossbar and a second end that defines a second hook.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
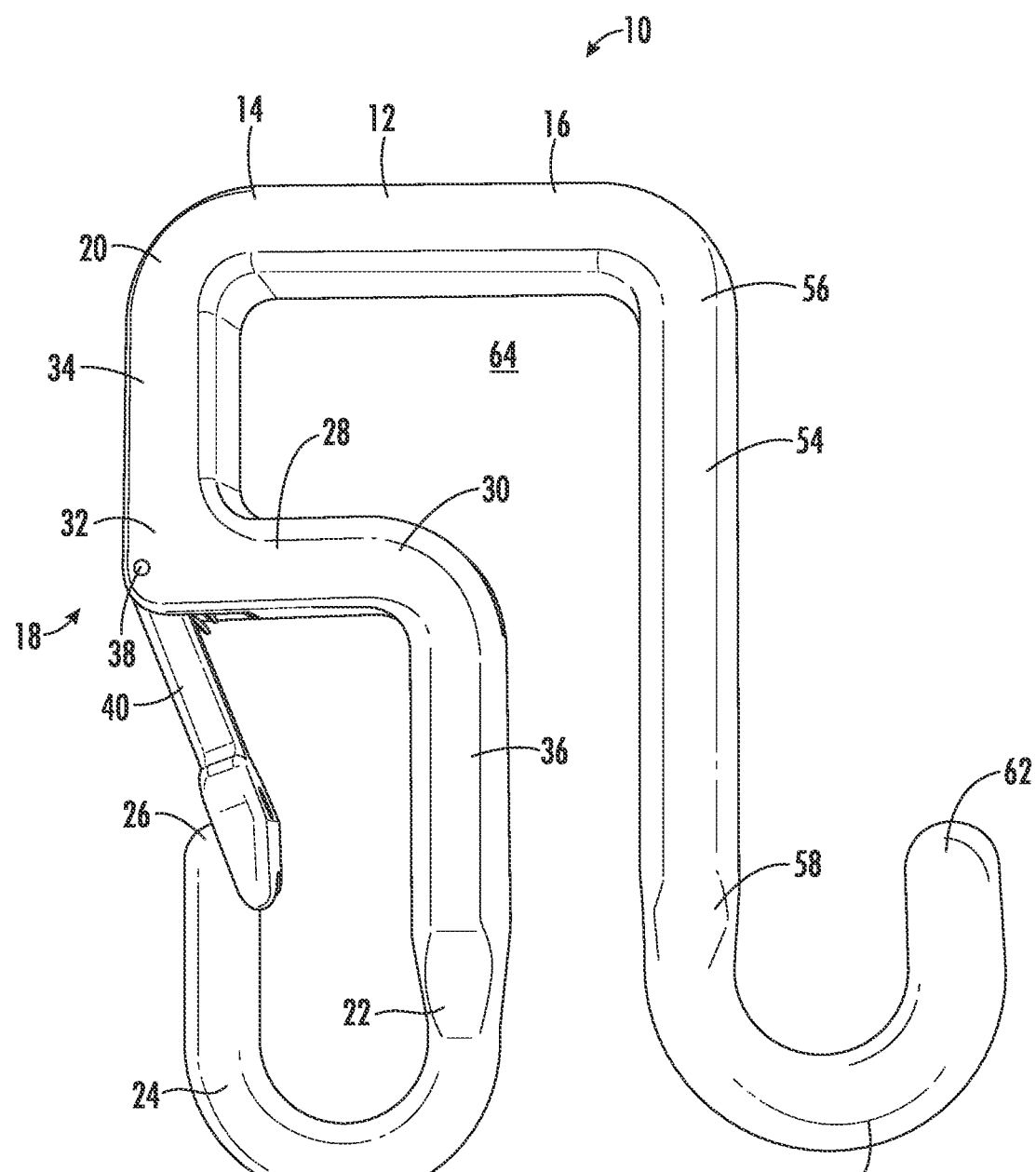
FIG. 1 is a front view of a bucket hook according to an exemplary embodiment of the present invention.

Referring to the drawings wherein identical reference numerals denote the same elements throughout the various views, FIG. 1 illustrates an exemplary bucket hook 10. The overall shape of the bucket hook 10 can be roughly described as an inverted "U".

The bucket hook 10 is functionally a unitary or integral device. In other words, the individual components described below function together as if the bucket hook 10 were made from a single piece of material. In practice, the bucket hook 10 may be of unitary or monolithic construction, i.e. could be made by forging, stamping, molding, etc. Alternatively, it may be built up from individual components secured to each other using techniques such as mechanical joints, bonding (e.g. welding or adhesives), or mechanical fasteners.

The bucket hook 10 includes a crossbar 12 with a first end 14 and a second end 16. In this example, the majority of the crossbar 12 has a square or rectangular cross-section.

A first leg 18 has a first end 20 (alternatively referred to as its upper end) that joins the first end 14 of the crossbar and a second end 22 (alternatively referred to as its lower end) that defines a first hook 24. In this example, the majority of the first leg 18 has a square or rectangular cross-section. The first hook 24 is generally U-shaped or C-shaped. The first hook 24 extends in an outboard direction relative to the body of the bucket hook 10 and is oriented in a concave direction relative to the crossbar 12. In the illustrated example, the first hook 24 has a circular cross-section, and a distal end 26 of the first hook 24 is formed into a hemispherical shape.

The first leg 18 generally has a stretched "Z" shape, including a middle segment 28 extending generally parallel to the crossbar 12 and having an inboard end 30 and an outboard end 32; an upper segment 34 extending between the outboard end 32 of the middle segment 28 and the first end 20 of the first leg 18, and a lower segment 36 extending between the inboard end 30 of the middle segment 28 and the second end 22 of the first leg 18.

A pivot 38 is disposed in the first leg 18, at the junction of the upper segment 34 and the middle segment 28. In the illustrated example, this takes the form of a pin passing through the first leg 18.

Figure 2:
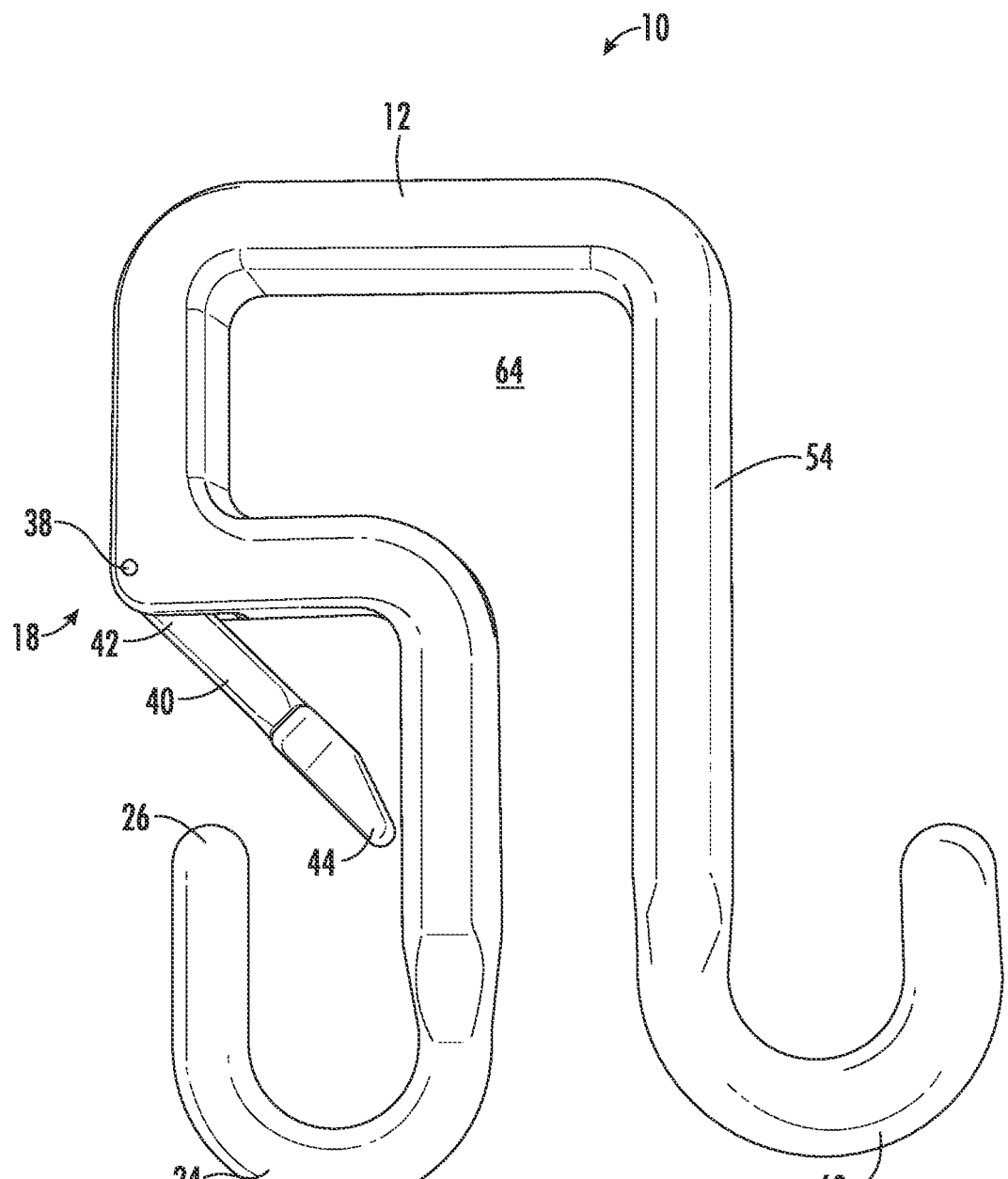
FIG. 2 is a front view of the bucket hook of FIG. 1, with a gate thereof in an open position.

A movable gate 40 is mounted to the first leg 18 and is movable between a first, closed position, shown in FIG. 1, in which it contacts the distal end 26 of the first hook 24; and a second, open position shown in FIG. 2, in which it is pivoted away from the distal end 26 of the first hook 24.

More specifically, the gate 40 has a proximal end 42 which is pivotally mounted to the first leg 18 by the aforementioned pivot 38, and a distal end 44 adjacent the distal end 26 of the first hook 24. In the illustrated example, the distal end 44 includes an enlarged tab 46 which has a concave recess 48 formed therein complementary to the shape of the distal end 26 of the first hook 24.

Figure 3:
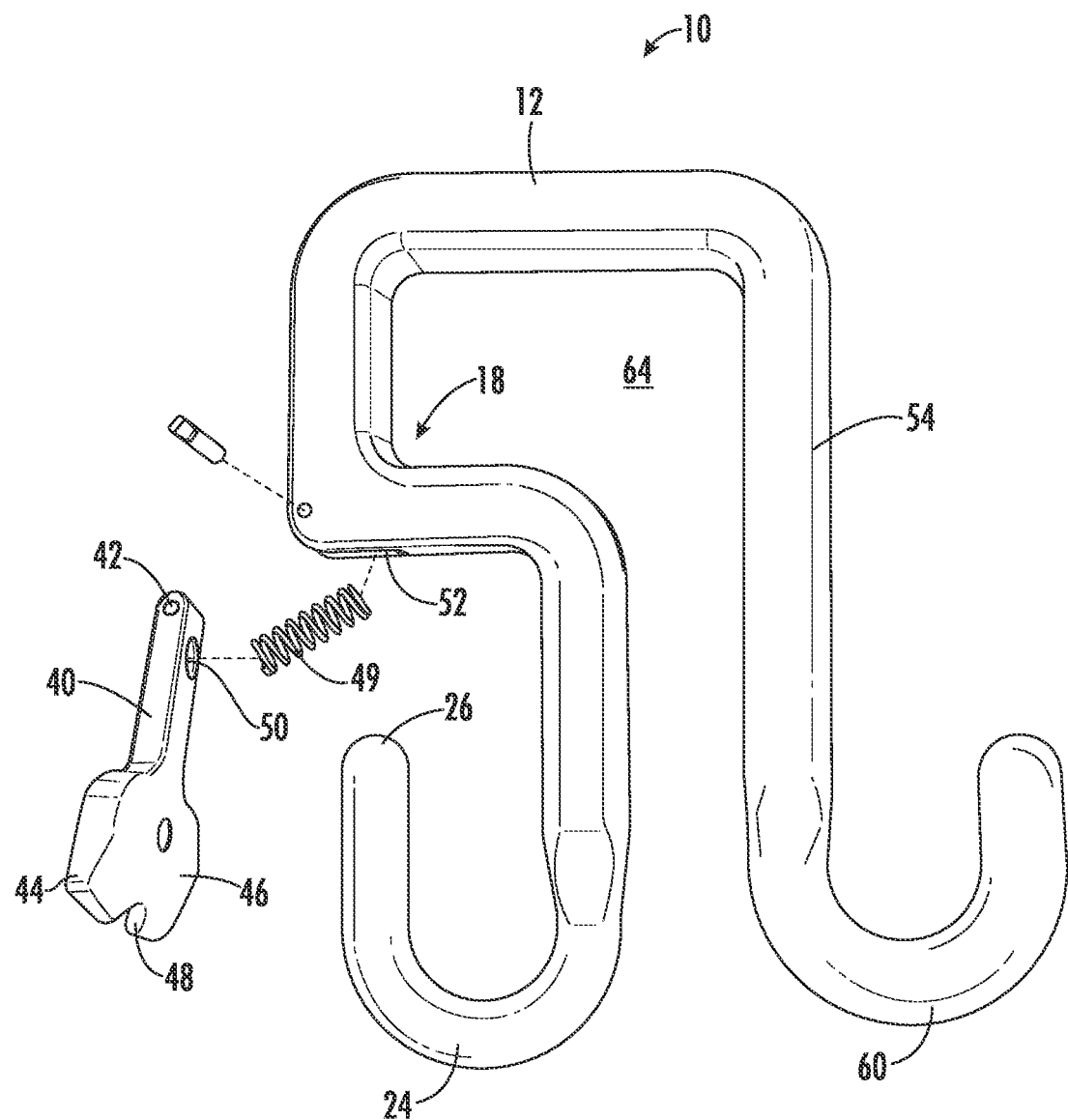
FIG. 3 is an exploded view of the bucket hook of FIG. 1.

Spring biasing means are provided for resiliently urging the gate 40 towards the closed position. As best seen in FIG. 3, this is affected in this particular example by providing a compression spring 49 having one end received in a counterbored seat 50 in the gate 40 and a second end received in a hollow pocket 52 of the first leg 18.

A second leg 54 has a first end 56 (alternatively referred to as its upper end) that joins the second end 16 of the crossbar 12 and a second end 58 (alternatively referred to as its lower end) that defines a second hook 60. In this example, the majority of the second leg 54 has a square or rectangular cross-section. The second hook 60 is generally U-shaped or C-shaped. The second hook 60 extends in an outboard direction relative to the body of the bucket hook 10 and is oriented in a concave direction relative to the crossbar 12. In the illustrated example, the second hook 60 has a circular cross-section and a distal end 62 of the second hook 60 is formed into a hemispherical shape.

The crossbar 12 interconnects the first leg 18 and the second leg 54. Collectively, the first leg 18, crossbar 12, and second leg 54 define an interior space 64.

The bucket hook 10 may be made of any suitable material having suitable strength, for example, metal, plastic, or a composite such as fiberglass-reinforced nylon. For insulated applications an electrically nonconductive material is preferred.

Figure 4:
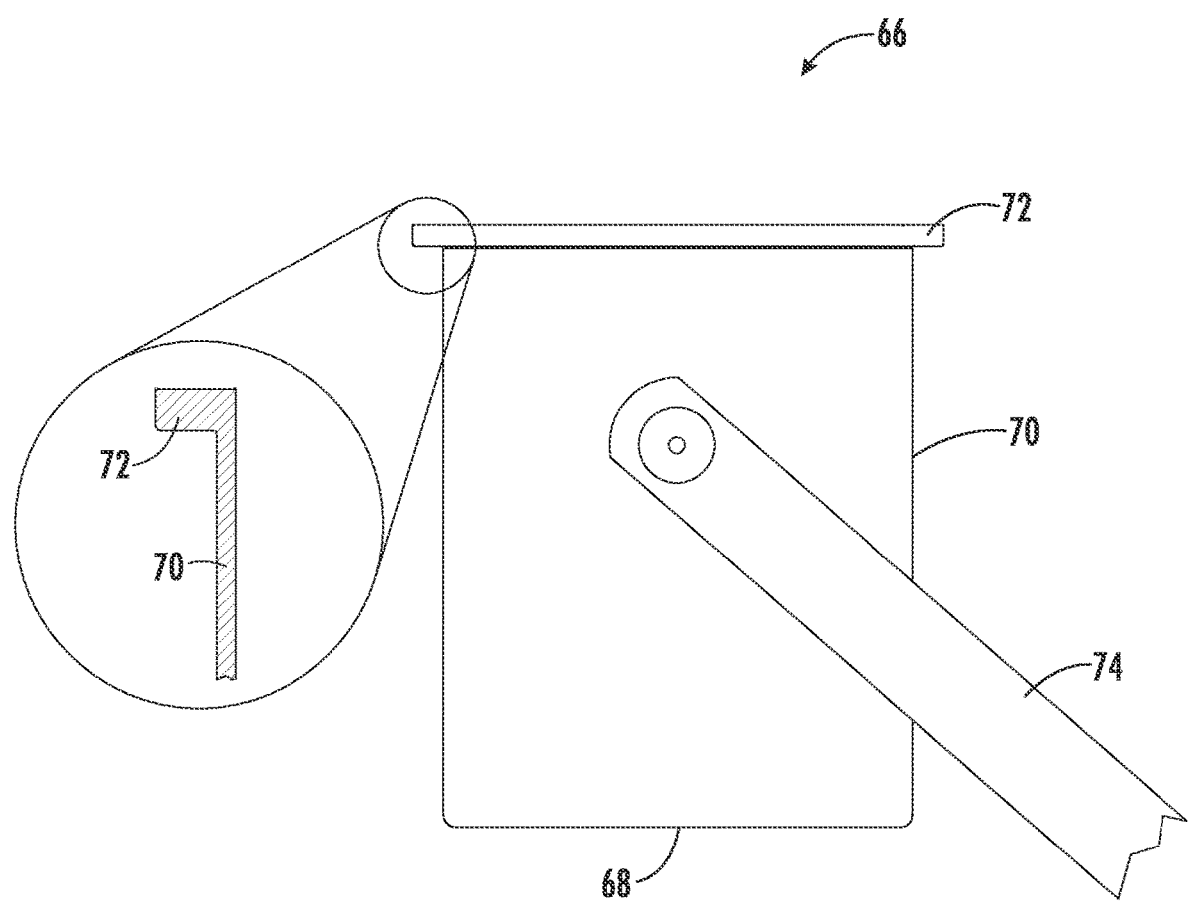
FIG. 4 is a schematic side view of a typical utility bucket.

The bucket hook 10 is configured to be mounted to a conventional bucket used for lifting personnel and equipment. An example of such a bucket is shown in FIG. 4. The bucket 66 includes a floor 68, sidewalls 70, and an upper flange 72. As best seen in the detail view of FIG. 4, the upper flange 72 extends laterally outwards from the upper edge of the sidewalls 70. The sidewalls 70 may define a variety of shapes such as squares, rectangles, other polygons, or a cylinder. The bucket 66 is shown connected to a conventional articulated boom 74 of a bucket truck (not shown).

Figure 5:
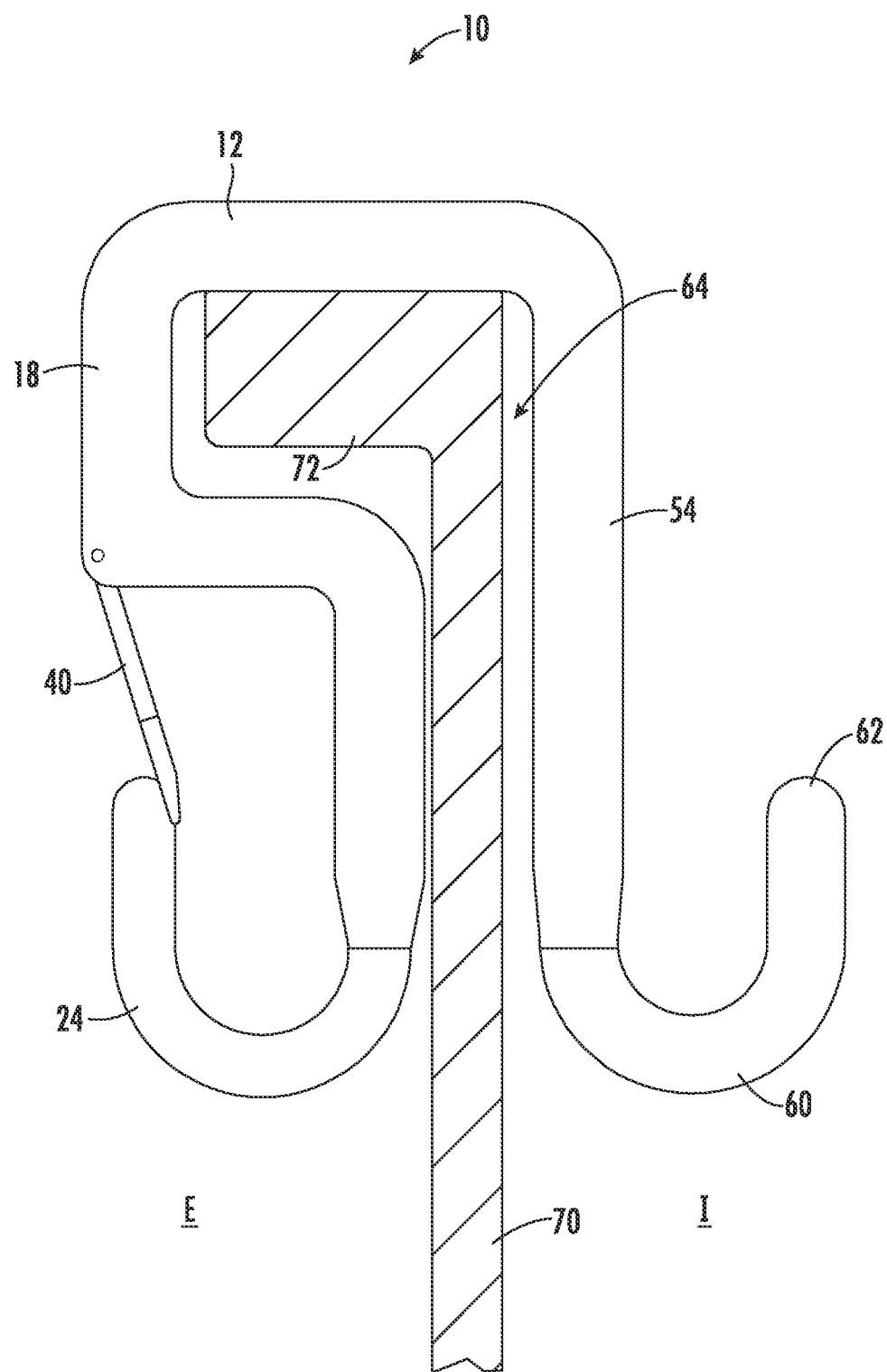
FIG. 5 shows a portion of the utility bucket of FIG. 4, with the bucket hook of FIG. 1 attached thereto.

Referring to FIG. 5, The interior space 64 of the bucket hook 10 is sized and shaped to fit over the upper flange 72 and sidewall 70 of bucket 66. In general, the interior space 64 may be described as forming an inverted "L" shape. The bucket hook 10 may incorporate some flexibility to permit it to be snapped over the upper flange 72. Flexibility can result from the choice of material, dimensions, or both. Thus installed, the first hook 24 is positioned on the exterior of the bucket 66 (referred to at letter "E" in FIG. 5) and the second hook is positioned on the interior of the bucket 66 (referred to at letter "I" in FIG. 5).

Thus installed, the bucket hook 10 is capable of suspending tools and equipment from the bucket 66. It's shape and size prevents it from accidentally disengaging from the upper flange 72.

Because of the presence of the gate 40, the first hook 24 is particularly useful for holding tools or equipment securely to prevent injury or damage from being accidentally dropped. An item may be placed in the first look 24 by pushing the gate 40 to the open position. Once the suspended item passes by the gate 40, the spring bias means returns the gate 40 to the closed position. This prevents the suspended item from being removed unless the gate 40 is intentionally opened. Nonlimiting examples of line worker tools that may be suspended from the first hook 24 rubber blankets, nose bags (optionally containing tools or materials therein), and/or strap jacks.

Nonlimiting examples of line worker tools that may be suspended from the second hook 60 include chain jacks, strap jacks, slings, and/or pulling straps.

The foregoing has described a bucket hook. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A bucket hook for supporting tools from a utility bucket, comprising:
    a first leg, including:
        a first hook;
        a gate mounted to the first leg and movable between a first position in which it contacts the first hook, and a second position in which it is pivoted away from the first hook; and
        spring biasing means resiliently urging the gate towards the closed position;
    a second leg spaced from the first leg; and
    a crossbar interconnecting the first leg and the second leg, wherein the first leg, the second leg, and the crossbar cooperatively define an interior space having an inverted L shape.

2. The bucket hook of claim 1, wherein the spring biasing means include a compression spring having one end received in a seat in the gate and a second end received in a pocket of the first leg.

3. The bucket hook of claim 1, wherein a distal end of the gate includes an enlarged tab.

4. The bucket hook of claim 1, wherein a distal end of the gate includes a concave recess complementary to a shape of a distal end of the first hook.

5. The bucket hook of claim 1, wherein a distal end of the first hook has a hemispherical shape.

6. The bucket hook of claim 1, wherein the first hook is U-shaped.

7. The bucket hook of claim 1, wherein the first leg has a stretched Z shape, including a middle segment, an upper segment, and a lower segment.

8. The bucket hook of claim 1, wherein the second leg includes a second hook.

9. The bucket hook of claim 2, wherein the second hook is U-shaped.

10. The bucket hook of claim 1, wherein at least a portion of the crossbar, the first leg, or the second leg has a square or rectangular cross-sectional shape.

11. A bucket hook for supporting tools from a utility bucket, comprising:
    a crossbar with a first end and a second end;
    a first leg extending between a first end that joins the first end of the crossbar and a second end that defines a second hook, the first leg including:
        a middle segment extending generally parallel to the crossbar and having an inboard end and an outboard end;
        an upper segment extending between the outboard end of the middle segment and the first end of the first leg; and and a lower segment extending between the inboard end of the middle segment and the second end of the first leg;

a gate having a proximal end which is pivotally mounted to the first leg by a pivot, and a distal end adjacent a distal end of the first hook, the gate being movable between a first position in which it contacts the first hook, and a second position in which it is pivoted away from the first hook;

spring biasing means resiliently urging the gate towards the closed position; and a second leg having a first end that joins the second end of the crossbar and a second end that defines a second hook.

12. The bucket hook of claim 11, wherein the first leg, the second leg, and the crossbar cooperatively define an interior space having an inverted L shape.

13. The bucket hook of claim 11, wherein the pivot is disposed in the first leg, at a junction of the upper segment and the middle segment.

14. The bucket hook of claim 11, wherein the spring biasing means include a compression spring having one end received in a seat in the gate and a second end received in a pocket of the first leg.

15. The bucket hook of claim 11, wherein the distal end of the gate includes an enlarged tab.

16. The bucket hook of claim 11, wherein a distal end of the first hook has a hemispherical shape.

17. The bucket hook of claim 16, wherein the distal end of the gate includes a concave recess complementary to the shape of the distal end of the first hook.

18. The bucket hook of claim 11, wherein the first hook is U-shaped.

19. The bucket hook of claim 11, wherein the second hook is U-shaped.

20. The bucket hook of claim 11, wherein at least a portion of the crossbar, the first leg, or the second leg has a square or rectangular cross-sectional shape.

\* \* \* \* \*